Dec. 1, 1964    F. W. PARRISH    3,159,769
HIGH VOLTAGE RECTIFIER CONSTRUCTION
Filed Nov. 9, 1960    2 Sheets-Sheet 1
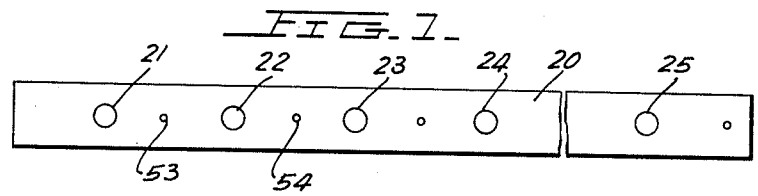
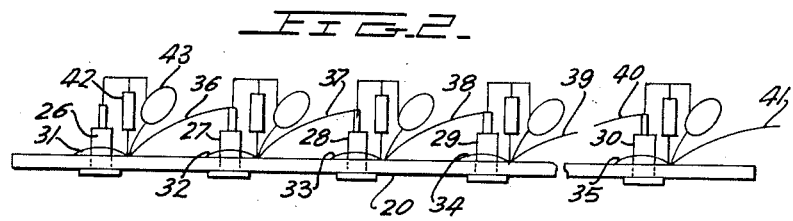
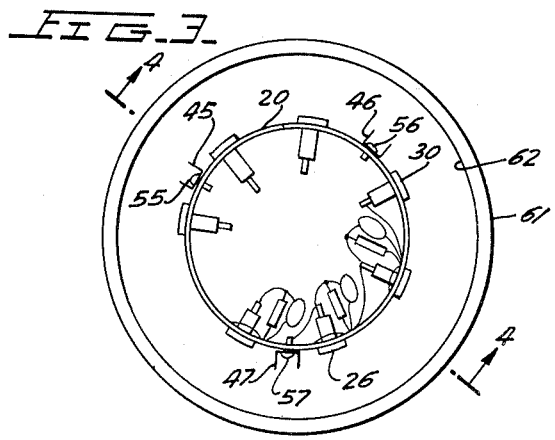
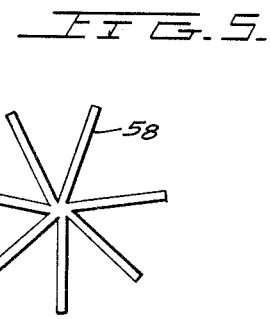
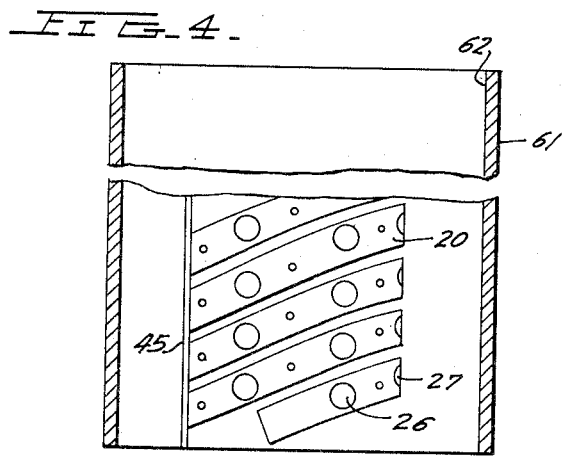
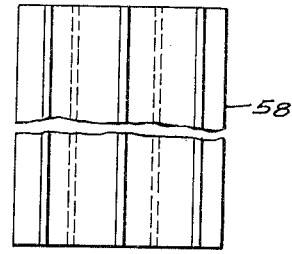
INVENTOR.
FRANK WILBERT PARRISH
BY
OSTROLENK, FABER, GERB & SOFFEN
ATTORNEYS Dec. 1, 1964 F. W. PARRISH 3,159,769
HIGH VOLTAGE RECTIFIER CONSTRUCTION
Filed Nov. 9, 1960 2 Sheets-Sheet 2

INVENTOR.
FRANK WILBERT PARRISH
BY
OSTROLENK, FABER, GERB & SOFFEN
ATTORNEYS

United States Patent Office 3,159,769
Patented Dec. 1, 1964

3,159,769
HIGH VOLTAGE RECTIFIER CONSTRUCTION
Frank Wilbert Parrish, Lakewood, Calif., assignor to International Rectifier Corporation, El Segundo, Calif., a corporation of California
Filed Nov. 9, 1960, Ser. No. 68,173
5 Claims. (Cl. 317—99)

This invention relates to high voltage rectifier structures comprised of a plurality of series connected rectifier cells as shown in copending application Serial No. 34,191, filed June 6, 1960, entitled "High Voltage Rectifier Stack" by Edward J. Diebold and assigned to the assignee of the present invention, and more specifically relates to a high voltage rectifier structure wherein the individual cells are mounted on a single elongated strip which is later wound into a helix to form the mounting tube with the potential across the tube being uniformly distributed over the tube surface.

Above noted copending application Serial No. 34,191 described a high voltage rectifier comprised of individual series connected rectifier cells which are mounted along a helical path on the surface of an insulating tube. This distribution of the individual cells was shown in the above noted application to give extremely desirable potential distribution along the insulating tube surface which serves as a mount for the rectifier cells and decreases the possibility of localized breakdown along the mounting surface. When a tube is used in this manner, the tube itself must be machined in order to receive mounting brackets for mounting the cells, and in some cases access must be had to areas internal of the tube when mounting the rectifier cells.

In accordance with the present invention, the tube is formed of an elongated strip which is later wound in a helical form to form the tube. Since it is an elongated strip the strip may now be easily machined or stamped to receive simplified mounting means. When the strip is in its elongated or flat form the individual rectifier cells are connected to the strip and are electrically connected to one another. The strip is thereafter wound helically to form the tube.

While the preferred embodiment of this invention contemplates a thin, elongated strip where the rectifier cells are mounted along the length of the strip, it is possible to form the insulating strip of a flat, relatively rectangular member which is wrapped in the shape of a tube after the rectifier cells and their associated equipment are mounted on the sheet and electrically connected to one another. The cells, of course, will be located within the sheet so that when the sheet is wrapped to form a tube the cells will define a helical path. In this embodiment it is preferred that those elements adjacent the ends of the sheet which are to be joined are electrically connected after the tube is wrapped.

Accordingly, a primary object of this invention is to simplify the construction of high voltage rectifier devices comprised of a plurality of series connected rectifier cells.

Another object of this invention is to simplify manufacturing techniques of high voltage rectifier devices wherein the rectifier cells are positioned along a helix by mounting the rectifier cells on an elongated strip of insulating material and later winding the strip in a helix to form a tubular insulating support wherein the rectifier cells follow the path of the helix.

A further object of this invention is to provide a novel construction for an insulating tube for mounting rectifier cells which are to be connected in series by forming the wall of the insulating tube of a flat, elongated insulating strip.

A further object of this invention is to form the tubular insulating support for a plurality of rectifier cells of a flat strip which mounts the rectifier cells and any associated electrical equipment for the cell while the strip is flat.

A further object of this invention is to mount individual rectifier cells on a flat, thin insulating body which is later formed to the shape of a tube with the rectifier cells following the path of the helix around the tubular insulating sheet.

These and other objects of this invention will become apparent from the following description when taken in conjunction with the drawings in which:

FIGURE 1 is a top view of an elongated strip of insulating material which is machined to receive rectifier cells along its length.

FIGURE 2 is a side view of the strip of FIGURE 1 with rectifier cells mounted thereon which have respective voltage dividing resistors and capacitors.

FIGURE 3 is a top view of the strip of FIGURE 2 after the strip has been wound in a helical form and is mounted within an insulating housing.

FIGURE 4 is a cross-sectional view of FIGURE 3 taken across the line 4—4 of FIGURE 3 and specifically illustrates the manner in which the insulating sheet is wound in the form of a helix.

FIGURE 5 is a top view of an insulating spider which could be used as a form for winding the elongated insulating strip of FIGURE 2 into the helix shown in FIGURES 3 and 4.

FIGURE 6 is a side view of the spider of FIGURE 5.

Figure 10:
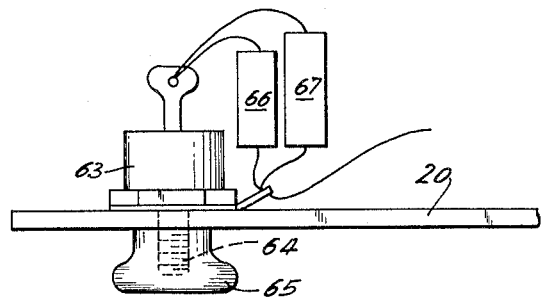
FIGURE 10 illustrates a modification of the method of mounting the individual rectifier cells to the elongated strip of FIGURE 1.

Referring now to FIGURES 1 and 2 in accordance with the present invention, the mounting tube for supporting a plurality of series connected rectifier cells is formed of an elongated strip 20 of insulating material having appropriate thinness to permit it to be later wound in a helical form. Insulating strip 20 could, for example, be constructed of any suitable insulating medium such as polyethylene, a laminated phenolic, melamine or any other material having the appropriate characteristics. The elongated strip 20 then has a plurality of openings cut therein by any desired method as by stamping or drilling such holes 21 through 25 shown in FIGURE 1. Clearly, the number of holes to be drilled is determined by the number of rectifier cells to be mounted to strip 20. The spacing of the holes will, of course, be determined by the required potential distribution along the tube to be ultimately formed. As then shown in FIGURE 2, rectifier cells of the so-called "top hat" construction have their small diameter cylindrical proportions inserted through openings 21 through 25 respectively with their lower enlarged head portions bearing against the bottom of strip 20. A friction gripping nut means 31 through 35 is then provided for rectifier cells 26 through 30 respectively to rigidly retain rectifier cells 26 through 30 to strip 20. This nut means, such as nuts 26 through 30 may be formed of the well known spring type nut which has an opening therein which will permit the rectifier cells to be pushed through the nut, but when it is attempted to remove the rectifier cells and move them in the opposite direction the opening in the nuts will tend to strongly grip the cells and prevent this reverse motion. A typical friction gripping means of this type is known to the art as "speed-nuts."

While a specific type of mounting of the rectifier cell is shown in FIGURE 1 and FIGURE 2, it will be understood by those skilled in the art that this mounting is given for illustrative purposes only, and that any desired type of fastener between the rectifier cells, which could be other than the "top hat" type shown in FIGURE 2, could be used for securing the rectifiers to the elongated strip 20.

Once rectifier cells 31 through 35 are secured to strip 20, and while the strip is still flat, the rectifier cells are connected in series with one another as by conductors 36 through 41. At the same time, and if the voltage distributing electrical devices are to be used such as resistor 42 and capacitor 43, which are connected across rectifier cell 26, such components are attached by means such as soldering, welding, or crimp type pressure connectors, or other appropriate methods to nuts 31 through 35 while the strip 20 is still flat. It is to be noted that in the embodiment of FIGURE 2 that one lead of capacitor 43 and the left hand end of lead 36 are connected together at nut 31 which is assumed to be conductive and electrically connected to the casing of rectifier cell 26.

From the foregoing it is seen that strip 20 when in the flat form, lends itself to very simple preparation by stamping holes 21 through 25 in the flat member and also that it lends itself to convenient assembly of the rectifiers and their associated voltage balancing equipment.

In order to now form this strip in a helical form the strip is wound as shown in FIGURES 3 and 4 by any appropriate winding means and the helix is thereafter held in place by insulating channel members 45, 46 and 47, or by winding around a spider type of form 58, or by inserting inside an insulating tube and permitting the helix to expand to the full inside diameter of the insulating tube.

Figure 7:
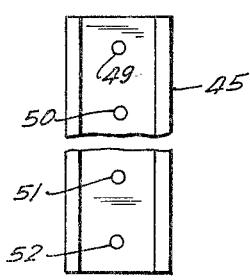
FIGURE 7 is a front view of an insulating channel member used in FIGURES 3 and 4 to hold the elongated insulating strip in its spiral form.
Figure 8:
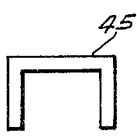
FIGURE 8 is a top view of the insulating channel of FIGURE 7.

The insulating channel members 45, 46 and 47 are formed as best shown in FIGURES 7 and 8 for the case of channel 45. Thus, channel 45 has a plurality of small openings 49, 50, 51 and 52 formed therein. The spacing of these openings defines the pitch of the helix formed by elongated strip 20. As is seen in FIGURE 1 the strip 20 has further openings such as openings 53 and 54 stamped between the openings which receive the rectifier cells. Openings such as openings 53 and 54 cooperate with appropriate openings of the group of openings 49 through 52 whereby an insulating rivet means such as rivets 55, 56 and 57 shown for channels 45, 46 and 47 of FIGURE 3 secure the channels to each turn of the helix formed by strip 20.

If desired, the openings such as openings 53 and 54 of FIGURE 1 formed in strip 20 can be tapped and rivets such as rivets 55, 56 and 57 of FIGURE 3 can be replaced by insulating screws whereby no access is needed to the center areas of the helix when securing the channels thereto.

In order to assist in the wrapping of strip 20 to its helical form to form the insulating tube, it may be desirable to provide an insulating spider such as spider 58 of FIGURES 5 and 6 which serve as a mandril. Spider 58 will have an axial length equal to the axial length of the tubes to be ultimately formed and the spacing of its legs will be such that each leg will fit between two radially adjacent rectifier cells. It will be noted that this spider will additionally form an insulating barrier between adjacent cells so as to increase the voltage rating of the system.

While the invention as specifically described here requires the strip 20 to be wound in a helix, it will be noted that this helix can follow any desired form. Thus, it can form a cylinder or, for example, could form a truncated cone or any other shape where varying diameter of the assembly is desired for any reason.

Figure 9:
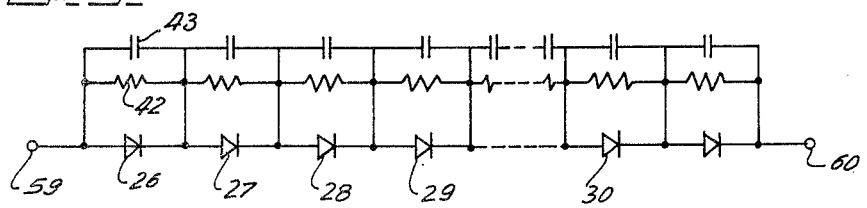
FIGURE 9 is an electrical schematic diagram of the circuit formed by the rectifier unit of FIGURES 3 and 4.

The final assembly of the rectifier cells of FIGURES 3 and 4 is schematically shown in FIGURE 9 as being comprises of the rectifier cells such as cells 26 through 30, each having respective voltage balancing resistors and capacitors such as resistor 42 and capacitor 43 for cell 26. The total number of cells in series will determine the maximum potential which can appear between terminals 59 and 60.

Once the strip 20 is wound in the helical form of FIGURES 3 and 4, it can then be contained within the large diameter insulating housing 61. Housing 61 can, if desired, have a metalized internal surface 62 which is concentrically spaced with respect to the rectifier cell assembly. One end of surface 62 is then connected to one end of the string of rectifier cells (not shown) so as to form a capacitive or Faraday shield, as described in the aforementioned U.S. patent application Serial Number 34,191. The housing 61 may then, if desired, be filled with a solid or sponge type of dielectric medium such as an epoxy or polyester encapsulating compound, or can be filled with some insulating liquid dielectric such as a standard transformer oil or similar medium.

Figure 11:
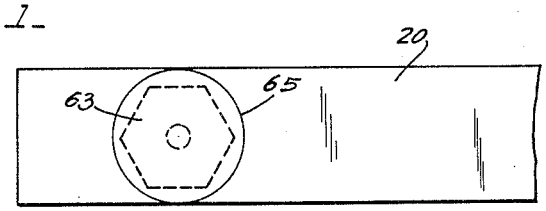
FIGURE 11 is a bottom view of FIGURE 10.

As has been pointed out above, the manner in which the rectifier cells are secured to the strip can be varied. Thus, in FIGURES 10 and 11, and where the rectifier is of the higher power rating type than the "top hat" construction type device, the individual rectifier cells such as rectifier cell 63 may be of the "stud" type wherein a stud 64 extends outwardly of cell 63. In such a construction a blind nut 65 threadably receives stud 64 in the manner shown in order to secure the cells such as cell 63 to strip 20. Nut 65 will preferably have a blind, tapped nut and appropriate radii to eliminate corona discharge. Appropriate balancing components such as resistor 66 and capacitor 67 are then electrically connected across each cell as indicated in FIGURE 2.

In winding the strip into helical form, the flat smooth base of the "top hat" diode, or the blind nut 65 on "stud type" rectifiers should preferably be located on the external diameter of the helix (as illustrated in FIGURE 3) in order to present a smooth and rounded external surface which is well known in the high voltage art as a means of minimizing or preventing corona discharge.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:

1. A tubular insulating support for a plurality of electrical devices electrically interconnected with respect to one another; said tubular insulating support comprising an elongated strip of insulating material wound in the form of a helix; said elongated strip of insulating material having a plurality of receiving means along the length thereof; each of said receiving means mechanically receiving respective electrical devices of said plurality of electrical devices.

2. A tubular insulating support for a plurality of electrical devices electrically interconnected with respect to one another; said tubular insulating support comprising an elongated strip of insulating material wound in the form of a helix; said elongated strip of insulating material having a plurality of receiving means along the length thereof; each of said receiving means mechanically receiving respective electrical devices of said plurality of electrical devices; said receiving means comprising openings formed in said flat elongated strip.

3. A tubular insulating support for a plurality of electrical devices electrically interconnected with respect to one another; said tubular insulating support comprising an elongated strip of insulating material wound in the form of a helix; said elongated strip of insulating material having a plurality of receiving means along the length thereof; each of said receiving means mechanically receiving respective electrical devices of said plurality of electrical devices and an insulating spider; said insulating spider having a plurality of legs radially extending therefrom and having an axial length substantially equal to the axial length of said helix; said elongated strip of insulating material being wound on said spider.

4. A tubular insulating support for a plurality of electrical devices electrically interconnected with respect to one another; said tubular insulating support comprising an elongated strip of insulating material wound in the form of a helix; said elongated strip of insulating material having a plurality of receiving means along the length thereof; each of said receiving means mechanically receiving respective electrical devices of said plurality of electrical devices and an insulating spider; said insulating spider having a plurality of legs radially extending therefrom and having an axial length substantially equal to the axial length of said helix; said elongated strip of insulating material being wound on said spider; said legs of said spider being interposed between radially adjacent electrical devices of said plurality of electrical devices mounted on said elongated strip.

5. A tubular insulating support for a plurality of electrical devices electrically interconnected with respect to one another; said tubular insulating support comprising an elongated strip of insulating material wound in the form of a helix; said elongated strip of insulating material having a plurality of receiving means along the length thereof; each of said receiving means mechanically receiving respective electrical devices of said plurality of electrical devices; said plurality of electrical devices being mounted on the surface of said insulating strip which is internal of said helix.

References Cited in the file of this patent

UNITED STATES PATENTS

| | | |
|---|---|---|
| 2,430,904 | Boldingh | Nov. 18, 1947 |
| 2,633,526 | Snyder | Mar. 31, 1953 |
| 2,647,224 | Bruck | July 28, 1953 |
| 2,703,853 | Chrystie | Mar. 8, 1955 |
| 2,720,578 | Caffiaux | Oct. 11, 1955 |
| 2,892,131 | MacDonnell | June 23, 1959 |
| 2,936,409 | Jackson et al. | May 10, 1960 |
| 2,962,801 | Cass | Dec. 6, 1960 |

OTHER REFERENCES

"The Technograph System of Printed Circuits," Holland Street Press, Ltd., London, 1954, pp. 28–29.